Oct. 6, 1953        J. P. REYNOLDS        2,654,163

AUTOMATIC INDICATOR FOR TELEVISION QUIZ SHOWS

Filed May 24, 1950        4 Sheets-Sheet 1

INVENTOR.
JOHN P. REYNOLDS
BY Russell C. Lane his ATTORNEY

Oct. 6, 1953  J. P. REYNOLDS  2,654,163
AUTOMATIC INDICATOR FOR TELEVISION QUIZ SHOWS
Filed May 24, 1950  4 Sheets-Sheet 3

INVENTOR.
JOHN P. REYNOLDS
BY Russell C. Lane
his ATTORNEY

Oct. 6, 1953          J. P. REYNOLDS          2,654,163
AUTOMATIC INDICATOR FOR TELEVISION QUIZ SHOWS
Filed May 24, 1950                           4 Sheets-Sheet 4

INVENTOR.
JOHN P. REYNOLDS
BY Russell C. Lane
his ATTORNEY

Patented Oct. 6, 1953

2,654,163

UNITED STATES PATENT OFFICE 2,654,163

AUTOMATIC INDICATOR FOR TELEVISION QUIZ SHOWS

John P. Reynolds, Dayton, Ohio

Application May 24, 1950, Serial No. 163,955

3 Claims. (Cl. 35—9)

This invention relates to quiz programs where a plurality of contestants strive at the same time to solve a definite set of problems or to answer a particular set of questions which are simultaneously presented to all of the contestants. The invention and its embodiment is particularly adapted for use on quiz programs where the contestants, the questions or problems, a plurality of suggested answers for the questions or problems, and the selection of answers by the contestants can all be seen by the audience or the attendants at a studio or auditorium. In the case of a television program all of the elements of the quiz show can also be viewed by the home audience over their individual receivers, and participated in to some extent.

It is therefore an object of the invention to provide an apparatus including an automatic indicator that registers immediately the first one of a plurality of contestants who first obtains the correct solutions for a group of questions or problems.

In accomplishing the object each contestant selects an answer by closing one answer switch for each question or problem, which is indicated by a light, and which, if correct, add up to form and energize a series circuit including a relay controlling the power delivered to the answer means for the other contestants. The first correct set of answers interrupts the power applied to the other parts of apparatus, so that the sole set of lamps that remains lighted instantly indicates the contestant first having the correct solution.

Electrical means provide for the display of answers selected by contestants presented with a plurality of possible answers for a set of questions in a selected category, and indicate the contestant who first selects the correct answers for all of the questions proposed, accompanied with a cut-out in the power supply for the other contestants so that their solutions will not be completely indicated, but will be cancelled.

To accomplish the foregoing, and assuming a condition of three contestants on the program though a larger or smaller number may be provided for, a control panel is provided for each contestant which panel provides as many answer sections as there are questions to be answered, each section having as many answer buttons or switches as there are proposed answers for each question. Each contestant's control panel is powered through a relay operated switch in each of the other panels and is so connected that the selection of all the proper answers in any one panel effects the interruption of power to all of the other panels.

In order that all contestants may have equal opportunity to participate in the contest, they are briefed on the conditions of the contest and instructed that a set of questions will be flashed upon the screen or otherwise displayed where all contestants may see them, and that associated with each question there will be a plurality of statements, one of which will be the correct answer for the question with which it is associated. The contestants are then told that their task is to pick out the correct statement or answer and indicate their selection by punching the corresponding button on their control panel. The top section of their panel relates to the first question while the middle section relates to the second question and the bottom section to the third question. The numbered push buttons on each section correspond to the similarly numbered answer statements under the related question, and when depressed effect the closing of an indicator circuit that may be seen by both the studio and home viewing audience and the contestants, and also closes a solenoid circuit that operates a gang switch or other multi-circuit device to establish a holding circuit and part of a blockout circuit which when completed by selection of all answers will interrupt the power line to the other panels. The blockout circuit can be completed only by selection of all the correct answers to the set of questions determined by punching the correct button, and which is determined by the master of ceremonies at a remote point or at least out of view of the contestants, and changed for each set of questions.

The briefing of the contestants might include a short lecture on the general subject within which lecture there will be injected subject-matter or statements from which the correct answers may be gleaned. The subject of the test questions may be in the nature of a film or series of pictures projected upon the screen, such as a film on safety, a travelogue, or an instructive presentation of some sport or other subject of general interest to both the contestants and the audience, both present in the studio and seated before their television receivers. Other test subjects of questioning might include some part of the manufacturing or processing of the sponsor's product, for instance the different types of American tobacco, the curing, use, marketing, inspection, and research involved, and all phases of the tobacco business that are not trade secrets. Of course the screen and the contestants with their control panels and display or indicator boards will be visible to the studio and unseen audience while the contestants are striving for solution of the questions, whereby they can mentally compete with or cheer for the contestants.

Figure 1:
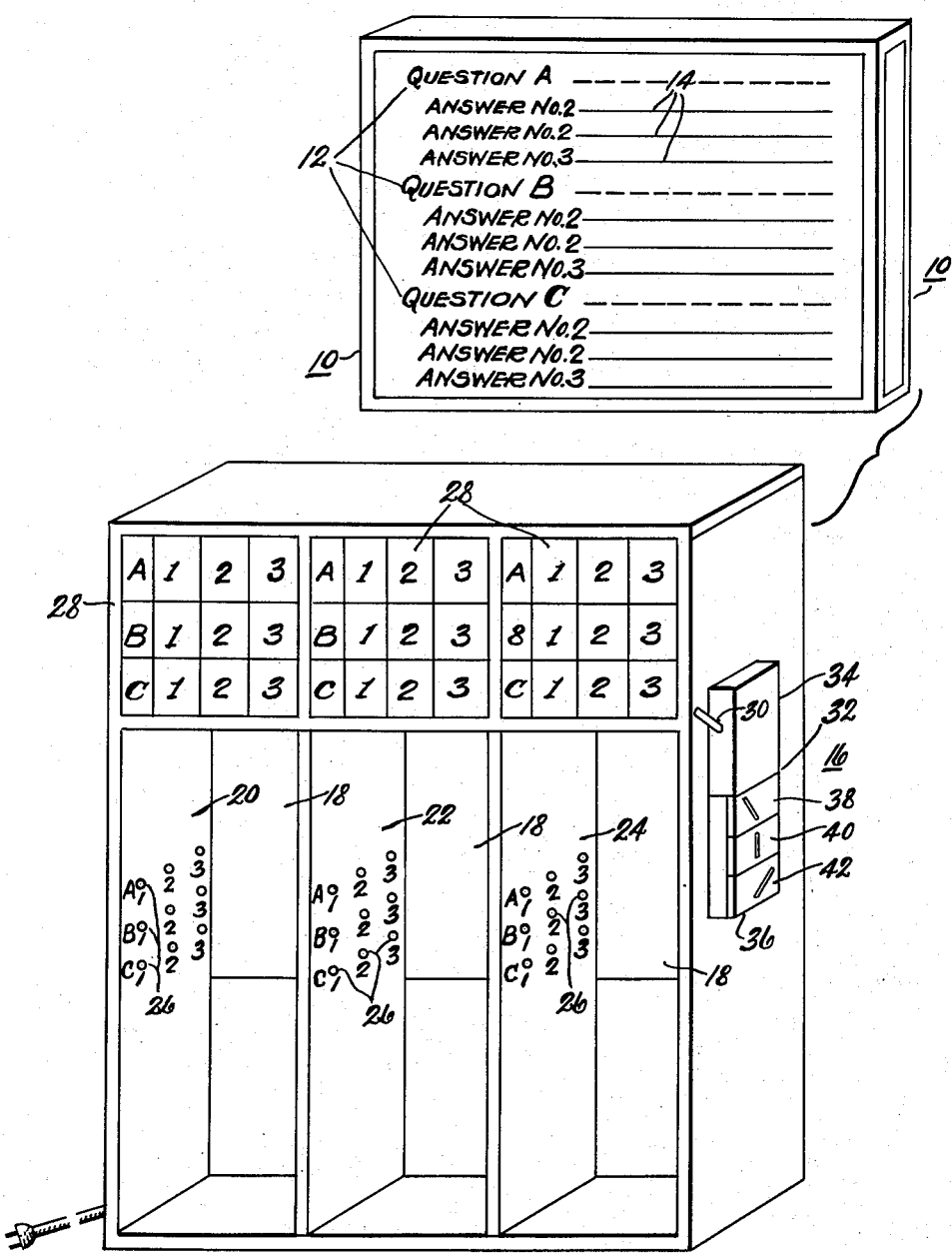
Fig. 1 illustrates one form of physical arrangement for the equipment used in the television test program.

With particular reference to the drawings, 10 refers to a screen curtain or other means upon which is shown the film, or other preliminary material used in briefing the audience and contestants, and upon which is later posted the questions 12 and the proposed answer statements 14. For purposes of comparison the questions are indicated thereon as "Question A," "Question B" and "Question C," and the answers for each question are designated as "Answer No. 1," "Answer No. 2" and "Answer No. 3," of which one of each answer group of three answers is true for the question posted. There is no indication or suggestion from the posting of the answers, as to which one is correct. At 16 is shown a contestants' booth having a compartment 18 for each contestant where he is confronted with a contestant's panel 20, 22 or 24 each fitted with a plurality of push buttons or switches 26 arranged in horizontal rows designated A, B, and C, with the buttons or switches in each row designated 1, 2 and 3 to correspond with the identification of questions and answers shown upon the screen 10. Associated with each of the contestant's panels 20, 22 and 24 there is a register 28 each fitted with a plurality of windows for indicating the answers selected by the contestant working on the respective panel.

In order that the audience may follow the progress of the contestants the windows are arranged in three horizontal rows marked A, B, and C while the windows in each row are marked 1, 2, and 3. Lamp or light sources behind each window are tied in electrically with the push buttons and respective control apparatus so that indication will be given as to the push button that is operated, and a cable 30 of electric wires connects the control apparatus with a master controller 32 situated at a remote point or at least out of sight of the contestants, and so as to be operated by the master of ceremonies. The master controller 32 includes a gang switch section 34 that sets the relation of the push buttons that will give the correct answers to the questions and also has a template section 36 fitted with replaceable guides 38, 40 and 42 that control the position of the selector switches in the master controller 32. On the other hand a single template, which is one of several, may be used to actuate each of the gang switches so that different combinations of answer circuits can be set up. Each of the templates may fit over symmetric members for actuating the gang switches.

Figure 2:
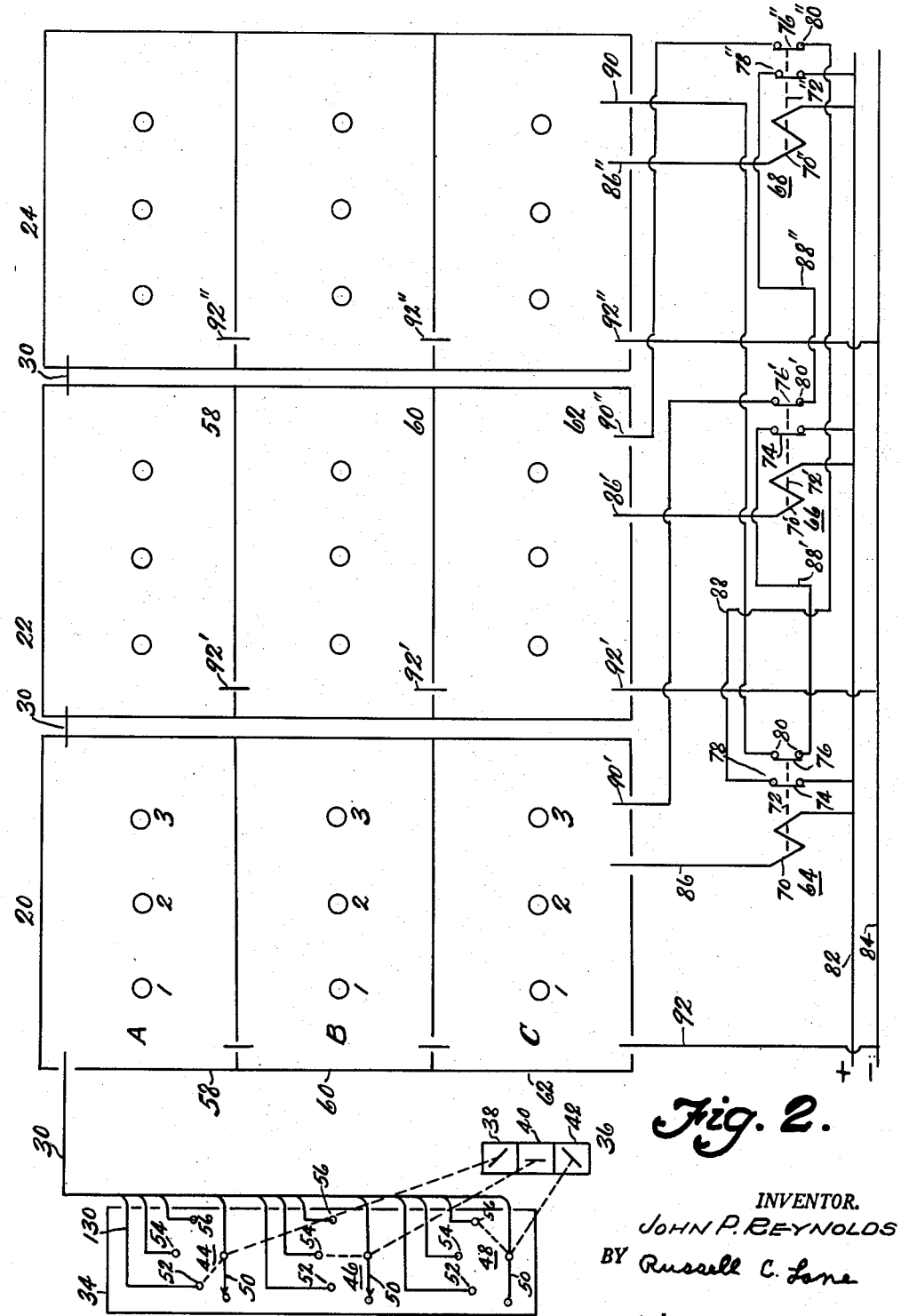
Fig. 2 is a planned arrangement for the contestants answer panels and master controller with interconnecting circuit portions.

In the gang switch section of the master controller there are a plurality of gang or multisection rotary switches 44, 46, 48, shown in Fig. 2, each gang of which has a separate switch for control of one section of the contestants control panel, there being one switch of the gang 44 for each of the panel sections A, one switch of the gang 46 for each of the panel sections B, and one switch of the gang 48 for each of the panel sections C. All of the switches of each gang are substantially identical and include a movable contact 50 adapted to engage contact points 52, 54, and 56 which have leads connecting by cable 30 to the respective devices in the proper sections of the contestant's control panels. As shown in Fig. 2, each contentant's panel 20, 22 and 24 are interconnected by an extension of the cable 30, and each panel is divided into sections 58, 60 and 62 identified as A, B and C to preserve the association with the questions of the same identity.

Each contestant's control pannl is fitted with a power control switch 64, 66 and 68, which when actuated interrupts the delivery of power to each of the other panels. All of the power control switches are identical insofar as they have a solenoid winding 70 operable upon an armature 72 insulatingly supporting a pair of movable contact bringing members 74 and 76 normally engaging contacts in pairs 78 and 80. Each solenoid winding 70 and one of its associated pair of contacts 78 are connected with the positive bus of a current source represented by the conductors 82 and 84. The other end of each of the solenoids 70 is connected by a lead 86 into the signal output line from the respective panel sections 58, 60 and 62. In each instance the other one of the pair of contacts 78 joins by conductor 88 with one of the pair of contacts 80 associated with one of the other two contestants' control panels, while the second one of that pair of contacts 80 connected by a lead 90 supplies a power line to one of the other contestant's panel By this arrangement, power to each and every contestant's panel is supplied through a closed switch in the other two contestants' panels connected in series from the positive bus 82 of the current source. As an example, the power lead 90' to the contestant's panel 20 connects to the switch 76, 80 of the power switch 66 for the panel 22 and thence to the switch 74, 78 of the power switch 68 from the positive bus 82. Likewise, the power lead 90'' for panel 22 has switch 76, 80 of power switch 68 and switch 74, 78 of power switch 64 connected in series, while the power lead 90 for the panel 24 has switch 76, 80 of power switch 64 and switch 74, 78 of power switch 66 connected to the same bus. Therefore, whenever one of the power switches opens power is cut off to both of the other panels. The power switch located in each panel is actuated by energizing the corresponding solenoid winding 70, but the energization of that winding depends entirely upon the relation of circuit connections established in each of the answer sections of the same contestant's panel, that relation of circuit connections being determined by the setting of the master controller 32.

Figure 4:
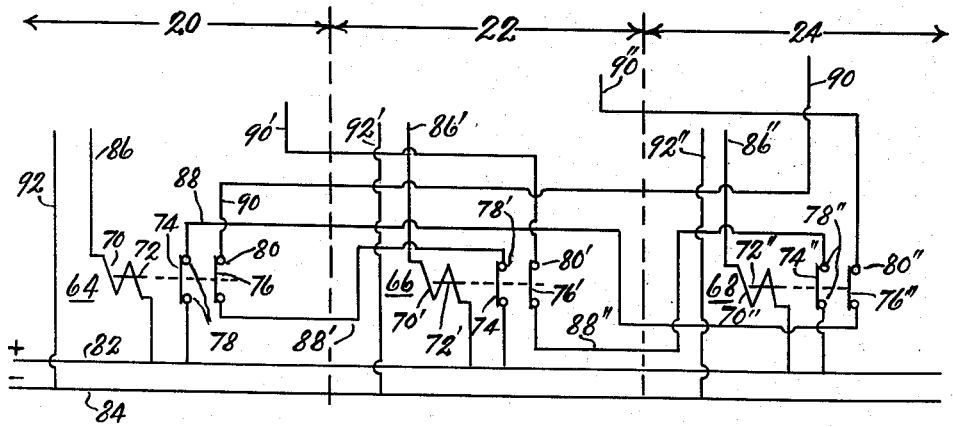
Fig. 4 is a circuit diagram for the power controls for all of the contestants' panels.

If the answer buttons 1, 2 and 3 of the question sections A, B and C are operated to provide the circuit connections called for by the master controller 32, then the signal output line 86 from that panel will be connected with the negative bus of the current source through the conductor 92, by the series relation of circuit connections established by operation of the answer buttons. As an example, if the relation called for by the master controller 32 is A1, B2, and C3, then the contestant who first completes operation of those particular buttons, connects the solenoid winding 70 of his control panel across the busses 82, 84 and effects operation of the armature 72 to open switches 74, 78 and 76, 80, thereby interrupting the power supply to each of the other contestant's control panels. That relation of the power control switches 64, 66 and 68 and the master control 32 with the contestant's control panels, except for the circuit connections for the answer sections, is shown in Fig. 2, while the inter-relation of the power control switches for all of the contestants' control panels is shown in Fig. 4 where the elements of panel 22 are indicated by the same reference character with a single prime (') added, while those for the panel 24 are indicated by the use of a double prime (''). Thus, elements 92, 86 and 90' feed into panel 20, while elements 92', 86' and 90'' feed into panel 22, and elements 92'', 86'' and 90 feed into panel 24. That relation is maintained in Fig. 5 where the power control switch 64 is shown connected into the circuit connections for the three answer sections A, B, C of the contestants' control panel 20.

Figure 3:
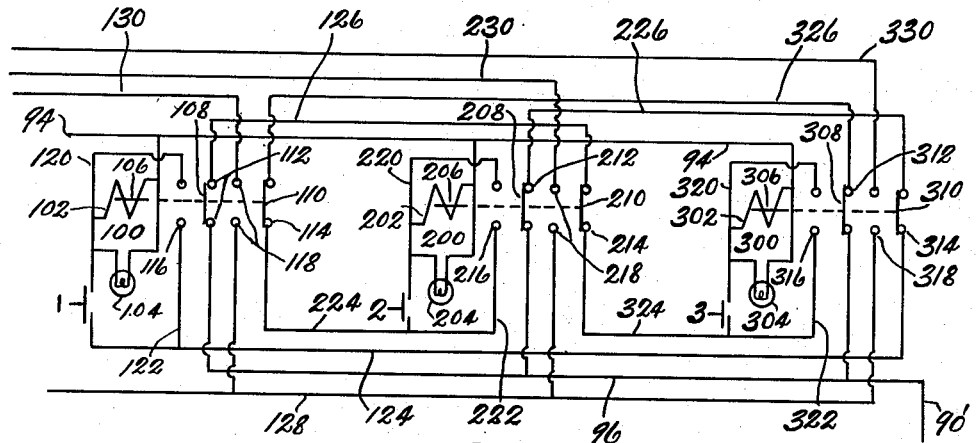
Fig. 3 is a circuit diagram of the circuit control elements with answer selecting and indicating means for each answer.

The conductor 92 connects the negative bus 84 with the movable contact 50 of the gang switch 44, and has branches 94 connecting with one side of all of the answer control and indicating circuits controlled by the push button switches 1, 2, and 3 in that panel. The power lead 90' has branches 96 connected with the other side of those circuits; the circuit completion between 92 and 90' depending on the circuit connections established by pressig the buttons 1, 2, and 3. The answer control and indication circuits are substantially identical for each section of the contestants' panel, and is shown by itself in Fig. 3, representing the question A section of contestants' panel 20. Three solenoid actuated gang switches or multi-contact relays 100, 200 and 300 are in controlled relation to the push button switches 1, 2 and 3, each comprising a solenoid winding 102, 202 and 302 in parallel with in-indicator lamps 104, 204, and 304, connected between one side of the push button switches 1, 2 and 3 respectively and the branch 94 leading by conductor 92 to the negative bus 84.

An armature 106, 206 and 306 operating as core members of the respective solenoid windings insulatingly support movable contact bridging members 108, 110 and 208, 210 as well as 308, 310, which bridging members normally engage pairs of rest contacts 112, 114 and 212, 214 as well as 312, 314, and are adapted upon energization of the corresponding solenoid winding to engage secondary pairs of contacts 116, 118 and 216, 218 as well as 316, 318. The secondary contacts 116, 216 and 316 connect by leads 120, 220, and 320 and by leads 122, 222 and 322, to form a holding circuit for the windings 102, 202 and 302, in parallel with the push button switches 1, 2 and 3 across the branch 94 and a conductor 124, 224 and 324 connecting with one of the sets of rest contacts in a different gang switch. The rest contacts 112, 212 and 312 when bridged by the members 108, 208 and 308 respectively establish a circuit connection between a common branch 96 from the power lead 90', and a jumper 126, 226 and 326 connecting to the other pair of rest contacts located in a different gang switch. One post of the pair of secondary contacts 118, 218 and 318 connect in parallel to a common conductor 128 running to a selector gang switch of an adjacent section, while the second post of the secondary pair connect by leads 130, 230 and 330 with the contact points of the associated selector gang switch.

When the solenoid actuated gang switches are in the rest position each of them establishes a circuit between the positive bus 82 and the negative bus 84 except for a single gap controlled by a push button in a different solenoid actuated gang switch. As an example, when the push button 1 is operated it connects solenoid 102 and lamp 104 across the conductors 94 and 96 by way of 124, 314, 310, 226, 212 and 208, from which it may be seen that a pair of normally closed contacts in each of the other solenoid actuated switches are in series with the push button switch whenever any one answer circuit is completed. Closing of answer switch 2 connects 202 and 204 between 94 and 96 through 224, 114, 110, 326, 312 and 308, while closing answer switch 3 similarly connects 302, 304 through 324, 214, 210, 126, 112 and 108. Closing of any answer switch 1, 2, or 3 serves to energize the respective solenoid 102, 202, or 302, and light the lamp 104, 204, 304.

Energization of the solenoids acts upon the respective armatures to move the bridging contact members 108, 208 and 308 from the rest position against contacts 112, 212 and 312 to engagement with the secondary contacts 116, 216 and 316 which establish the respective holding circuit 120, 122 and 220, 222 as well as 320, 322. The respective solenoids are thereby maintained energized though the answer switch 1, 2 or 3 are opened. Disconnecting the contacts 112, 212 and 312 prevents closing of another answer circuit in the same question section, which forestalls the contestant fishing around for the correct answer. Coincident with movement of the bridging members 108, 208, 308, the bridging members 110, 210 and 310 are moved away from the rest contacts 114, 214 and 314 to a position spanning secondary contacts 118, 218 and 318. Opening of the rest contacts 114, 214 and 314 form another breach in the circuits for both of the other answer circuits, while closing secondary contacts 118, 218 and 318 complete the circuit connections between the common conductor 128 and the leads 130, 230 and 330 respectively.

Determining the proper one of the answer switches and circuits to be selected in any one question section involves setting the movable contact 50 of the associated selector gang switch on one of the contacts 52, 54, or 56 which are the terminals of leads 130, 230 and 330 connecting to the common conductor 128, through the corresponding bridged secondary contacts 118, 218 and 318. When one of the templates in the section 36 (Fig. 2) is changed, the corresponding contact arm 50 of the selector switches is moved to a new position calling for a new combination of answer circuits to be selected for closing an electrical path across the conductors 86 and 92. It should be remembered that one of the answer circuits in section A serially connected to one of the answer circuits in section B, and serially connected to one of the answer circuits in the section C must form a conductive path between the conductors 90' and 92 before the winding 70 of the power control switch can be energized. When that winding is energized by closing a path across 96 and 92, the power supply to all other panels is interrupted, which cancels any answer circuits that may have been established on those panels.

Figure 5:
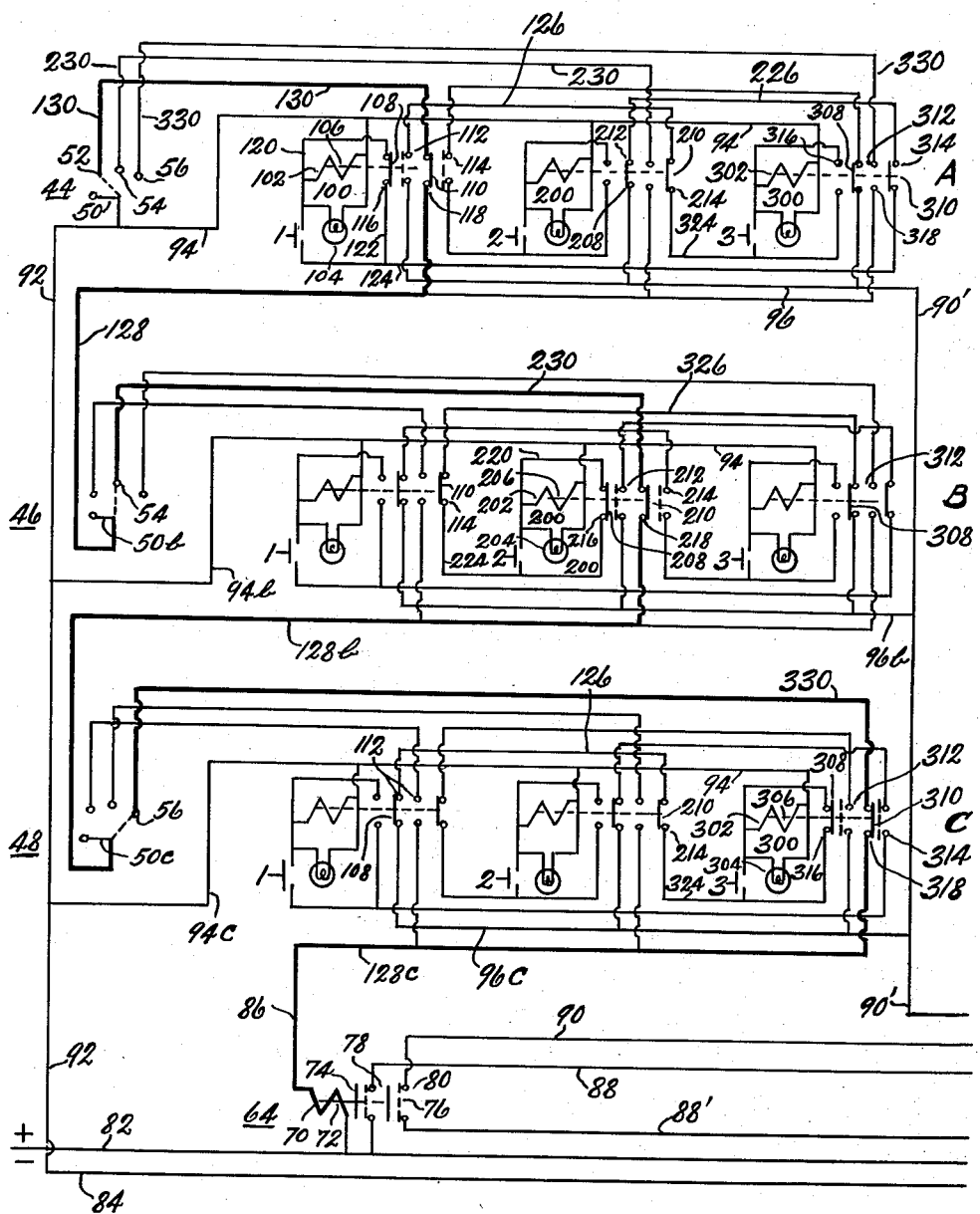
Fig. 5 is a complete circuit diagram for each of the contestant panels.

Reference to Fig. 5 will illustrate the relations between the answer circuits for each section of the panel and how those answer circuits are under the control of the master controller for completing an operative circuit for the power control relay. There the common conductor 128 for the question section A connects with the movable contact 50b for the selector switch 46 of the question section B, while the common conductor 128b of the question section B similarly connects with the movable contact 50c for the selector switch 48. The common conductor 128c in the question section C connects with lead 86 to connect with relay winding 70. All of the selector switches must be in some circuit closed relation with respect to their movable contacts 50 and the contacts points 52, 54 and 56. The template members 38, 40 and 42 determine the setting of the switches 44, 46 and 48 and the selection of answer switches that must be operated to form the conductive path between the conductors 92 and 86. Template member 38 operates to set all of the selector switches 44 and the one of their contacts 53, 54 and 56 that is engaged by the movable contact 50 fixes or conditions the answer circuit that must be energized to form one of the series segments between 92 and 86 to energize the winding 70 of the power switch.

Operation of the equipment can best be illustrated by assuming a set of questions and proposed answers, three for each question, and one of which is correct. Let it be assumed that a briefing or explanation has been given on the correct use of words in writing and speaking, and that the following questions and answers have been thrown upon the screen 10 for all to see.

Question A. Use the word "Mien" to denote:
 1. Appearance of a person,
 2. The middle point,
 3. An unpleasant manner.

Question B. The word "Tome" denotes:
 1. A resounding sound,
 2. A large book,
 3. The vaulted roof of a rotunda.

Question C. Does the word "Reek" mean:
 1. To be soaking wet,
 2. To cry out,
 3. To smell offensively?

In a recent issue of the Readers Digest magazine, the correct answers to the above were given and would appear to be as here arranged, A1, B2 and C3. Only the master of ceremonies is familiar with the fact, and therefore sets the master controller 34 to agree with the conditions. Template members 38, 40 and 42 are set into place that will respond to a plug-like member to adjust the movable contacts of all the switches to the proper position. As a guide, and referring to Fig. 2, the indicia 32 on the template members 38, 40 and 42 designate the inclination or position of the switch arm 50 in the corresponding switch, such as indicated by the dashed lines in Figs. 2 and 5. In those positions, contact point 52 of switches 44 connects conductor 92 with lead 130 that communicates with one of the secondary contacts 118 in the solenoid actuated answer circuit 100 of the question A sections. In a similar way, contact points 54 of switches 46 connect conductor 128 with lead 230 that communicates with one of the secondary contacts 218 in the answer circuit 200 of the question B sections, and the contact points 56 of switches 48 connect conductor 128b with lead 330 that communicates with one of the secondary contacts 318 in the answer circuit 300 of the question C sections.

Since the other one of the secondary contacts 118 joins the common conductor 128, while the other of secondary contacts 218 joins the common conuctor 128b and the opposing one of secondary contacts 318 joins the common conductor 128c, it should be apparent that conductors 92 and 86 will be bridged if the pairs of secondary contacts 118 of section A, the contacts 218 of section B, and the contacts 318 of section C are connected by the corresponding contact bridging members. To emphasize those connections the pertinent circuits have been shown in bold face, and the corresponding bridging members have been shown in position to connect the secondary contacts. That shows the circuit connections when all three of the questions are answered correctly, by any one contestant. To accomplish the solution each contestant in his compartment 18 reads the questions and answers displayed on the screen 10 from which he selects an answer he believes to be correct for the different questions.

If he selects No. 3 as the correct answer for question A, he would push button 3 in the section A of his conestant's panel. Winding 302 would be energized because of its connection through 94 to the conductor 92, and of its connection through 324, 214, 210, 126, 112, 108 and 96 to 90'. The armature 306 moves the bridging contact members 308, 310 away from contacts 312, 314 and engages them with the secondary contacts 316, 318, whereby the holding circuit for the winding 302 is energized, and the rest contacts 312, 314 are held open. Though the secondary contacts 318 are bridged which connects 128 to 330 there is an open point in the selector switch 44 between the contact 56 and the movable element 50 which is in engagement with contact point 52. Therefore, correct answers in the other sections will not complete the circuit and energize the power control relay. Once the contestant makes his selection he cannot change the answer until the control circuits are reset by the master of ceremonies and the master switch. Coincident with energization of the winding 302, the lamp 304 is lighted which shows up in the proper portion of the register 28, where it may be seen by those of the audience.

On the other hand supposing that the contestant knows all of the correct answers to the questions posted. Then he pushes answer button 1 of the A section, button 2 of the B section and button 3 of the C section. Referring to Fig. 5, closing of button 1 in the section A enregizes winding 102 and lamp 104 from 94, and leads by 124, 314, 310, 226, 212, 208 to 96 and thence 90'. Armature 106 moves the bridging members 108, 110 from rest contacts 112, 114 to engage secondary contacts 116, 118. The holding circuit for the winding 102 is now established, and one leg of the power cut-off circuit is established. It extends from conductor 92 through switch arm 50, contact 52 and elements 130, 110, 118, 128 to movable contact 50b of selector switch 46 in the B section, and by 230 thereof to one of the pair of secondary contacts 218 of the B section. When rest contacts 112 of the A section are opened, gang switch 300 can not be operated, and when rest contacts 114 of the A section are opened switch 200 cannot be operated. Closing of the answer switch 2 of the B section energizes the winding 202 and lamp 204 from 94b, and by leads 224, contacts 114, 116, 326, 308 to 96b and 90'.

In a similar manner the armature 206 moves the bridging members 208, 210 away from the rest contacts 212, 214 and to engage secondary contacts 216, 218, which establishes the holding circuit for the winding 202, and completes the second leg of the power cutoff circuit from the lead 230 through the common conductor 128b to the switch arm 50c of the selector gang switch 48 of the C section. The opening of rest contacts 212, 214 disables gang switches 100 and 300 respectively. The contestant selecting the correct answer for the third question operates push button 3 on the section C which energizes the winding 302 and lamp 304 from the line 94c through 324, 214, 210, 126, 112, 108 to 96c joining 90'. The armature 306 moves the bridging members 308, 310 away from the rest contacts 312, 314 to engage the secondary contacts 316, 318 respectively, whereby the third leg of the power cut-off circuit is completed from contact point 56 in the selector switch 48 through lead 330 and by way of 310, 318 to 128c which leaves no open point in the circuit between the movable arm 50 of the selector switch 44 and the winding 70 of the power control switch for that panel.

Suppose it be the contestant in the compartment 18 before the panel 20 that first completes the correct answers to all three of the questions posted on the screen 10. As he punches each of the answer buttons the corresponding lamp is lighted up on the register 28 giving an indication to the audience of the answers selected for each of the questions. The three questions may be answered in any order he chooses, but the answers selected must add up to the combination determined by the selector switches. He must make the right choice the first time, because once the answer button is operated the corresponding solenoid opens the circuits to the other answer circuits and maintains the holding circuit closed until released by the selector switch. The first contestant to select the correct answers energizes the power control switch of that panel.

Referring to Fig. 4, if the contestant before panel 20 is the first to select the proper answers, he thereby closes a circuit from 92 to 86 connecting with the negative and positive buses 84, 82. Energizing of winding 70 actuates armature 72 to move bridging members 74, 76 away from contacts 78, 80 which interrupts current to contestant's panels 22 and 24. That follows from the fact that contacts 78 when bridged by 74 connect bus 82 by 88, 80'' and 76'' with power lead 90'' for the panel 22, while contacts 80 when bridged by 76 connect power lead 90 for the panel 24, to the bus 82 by 88', 78' and 74'. On the other hand panel 20 is powered by 90' through 76', 80' of panel 22, in series with 88'' to 78'' and 74'' of panel 24. When the power leads 90'' or 90 are opened, all answer circuits that have been completed in the respective panels are deenergized and the completion of any other circuits in those panels is prevented, such that ultimately only one register 28 will be illuminated by three lamps, and the other two registers will be unlighted.

For illustration, and referring to Fig. 5, assume that one of the other panels has the right solution and has effected the opening of power line 90' to the panel here shown, and assume that answer circuits 1 and 2 of sections A and B respectively have been completed while answer circuit 3 of section C is still unselected. If power line 90' is open, then winding 102 is deenergized since its holding circuit from 94 includes 124, 310, 314, 226, 212, 208 and 96 which joins 90'. Winding 102 being deenergized the armature 106 returns the bridging members 108 and 110 to rest position engaging the rest contacts 112 and 114 respectively. The indicator light 104 also goes out. The same condition obtains with respect to the gang switch 200 in section B. The gang switch 300 of section C could not be operated because the winding 302 joining 94c through button 3 and circuit elements 324, 214, 210, 126, 112, 108 and 96c to 90' is then deenergized. Therefore neither winding 302 nor lamp 304 can be energized.

While the embodiment of the present invention as herein disclosed, constitutes a preferred form, it is to be understood that other forms might be adopted.

What is claimed is as follows:

1. A system for conducting a quiz program visually presenting before contestants a set of problems to be solved associated with the correct solution and a plurality of incorrect solutions, comprising in combination, controllable apparatus including selector means irrevocably operable by a contestant for independently indicating his selection of solution for each problem, means for visually indicating the particular solution selected by each contestant, means for secretly determining the solution for each problem which when all selected by any contestant will determine the winner, and means responsive to the first selection of solutions by any contestant that coincides with the secretly determined solutions for erasing the indicated solutions of all the other contestants.

2. The combination set forth in claim 1 wherein the irrevocable selector means includes a contestant's control panel providing an answer section for each problem presented, each answer section incorporating electrical apparatus and circuits for establishing as many answer circuits for the respective problem presented as there are correct and incorrect associated solutions, a magnetic switch in each answer circuit for energizing one leg of a power control circuit, a holding circuit for each magnetic switch, until the power of that panel is interrupted, and means dependant upon the selecting of all of the current solutions in the panel for serially connecting all of the legs of the power control.

3. In an amusement device having an electrical unit to be operated by closing of a secretly selected one of a plurality of control circuits for energizing said electrical unit, the combination comprising a current source with which the unit is to be connected, a switch and conductor means for secretly establishing one of the plurality of control circuits as the circuit that will when closed effect operation of the electrical unit, a relay for each control circuit conductor, having a coil and sets of contacts a manual switch for connecting the respective relay across the current source to energize the respective coil, each of said relays having a pair of normally open relay holding contacts in parallel with the manual switch which pair of contacts when closed maintains the coil of the respective relay energized, said sets of contacts being in addition to the pair of holding contacts and being equal in number to the number of control circuits conductors and including a second pair of contacts normally closed and connected serially between the source and a pair of normally closed contacts of a second relay for completing the coil energization of a third relay when its holding contacts are closed, a third pair of contacts normally open which when closed connect the electrical unit with the respective control circuit conductor, and a fourth pair of contacts normally closed and connected serially between the second pair of contacts of said third relay and the holding contacts of said second relay, the interconnection of relays being such that energization of the coil whose control circuit conductor secretly establishes one of the control circuits with the said switch, opens the normally closed contacts and closes the normally open contacts of the respective relay that prevents the energization of the coils of all other relays, and directly connects the electric unit across the current source.

JOHN P. REYNOLDS.

References Cited in the file of this patent

UNITED STATES PATENTS

| Number | Name | Date |
| --- | --- | --- |
| 546,003 | Chapman | Sept. 10, 1895 |
| 655,264 | Nichol | Aug. 7, 1900 |
| 1,173,788 | Fairchild | Feb. 29, 1916 |
| 1,906,260 | Gibbs | May 2, 1933 |
| 2,104,718 | Dougherty | Jan. 4, 1938 |
| 2,130,123 | Ebert | Sept. 13, 1938 |
| 2,401,434 | Mills | June 4, 1946 |
| 2,491,888 | Baker | Dec. 20, 1949 |
| 2,562,179 | Dorf | July 31, 1951 |